US007639930B2

(12) United States Patent
Mizukawa et al.

(10) Patent No.: US 7,639,930 B2
(45) Date of Patent: Dec. 29, 2009

(54) FILAMENT LAMP AND LIGHT-IRRADIATION-TYPE HEAT TREATMENT DEVICE

(75) Inventors: Yoichi Mizukawa, Himeji (JP); Tetsuya Kitagawa, Himeji (JP); Shinji Suzuki, Himeji (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 198 days.

(21) Appl. No.: 11/778,374

(22) Filed: Jul. 16, 2007

(65) Prior Publication Data

US 2008/0050104 A1 Feb. 28, 2008

(30) Foreign Application Priority Data

Aug. 24, 2006 (JP) ............................ 2006-227833

(51) Int. Cl.
*A21B 2/00* (2006.01)

(52) U.S. Cl. ...................................... 392/416; 392/407

(58) Field of Classification Search ....................... None
See application file for complete search history.

(56) References Cited

U.S. PATENT DOCUMENTS 2,031,182 A 2/1936 Smith
3,443,144 A * 5/1969 Freese, Jr. .................... 313/315
3,579,021 A * 5/1971 Kimball ...................... 313/274
3,617,797 A * 11/1971 Meijer et al. ........... 313/318.12
3,634,722 A * 1/1972 Palmer et al. ............... 313/279
3,678,319 A * 7/1972 Notelteirs et al. ........... 313/271
3,736,455 A * 5/1973 Notelteirs et al. ........... 313/274
4,080,548 A * 3/1978 Johnson ....................... 315/68
4,442,374 A * 4/1984 Morris et al. ............... 313/316
4,710,676 A * 12/1987 Morris et al. ............... 313/579
5,962,973 A * 10/1999 Rice ........................... 313/580
6,876,816 B2 4/2005 Shigeoka et al.
7,471,885 B2 * 12/2008 Mizukawa et al. .......... 392/407

(Continued)

FOREIGN PATENT DOCUMENTS

DE 100 24 709 A1 11/2001

(Continued)

OTHER PUBLICATIONS

European Search Report of Application No. EP 07 01 3406.

*Primary Examiner*—Thor S Campbell
(74) *Attorney, Agent, or Firm*—David S. Safran; Roberts Mlotkowski Safran & Cole, P.C.

(57) ABSTRACT

A filament lamp that allows independent control of the state of luminescence of multiple filaments and that reliably prevents the occurrence of unwanted discharge between adjacent portions of neighboring filaments, even when a high voltage is injected into the filaments to achieve a desired irradiation distribution, and light-irradiation-type heat treatment device that can heat the article to be treated uniformly. The filament lamp has multiple filament assemblies, each having a filament and respective leads arrangement sequentially within a light emitting bulb, in the axial direction of the light emitting bulb. With alternating current power supplied to each filament independently, the current will be supplied with the same phase and mutually adjacent terminals of neighboring filament assemblies will have the same potential, and with direct current power supplied to each filament independently, adjacent terminals of neighboring filament assemblies will be of the same polarity. The light-irradiation-type heat treatment device uses multiple filament lamps of this type.

10 Claims, 9 Drawing Sheets

U.S. PATENT DOCUMENTS

| | | | |
|---|---|---|---|
| 2004/0060917 A1 | 4/2004 | Liu et al. | |
| 2004/0112885 A1 | 6/2004 | Shigeoka et al. | |
| 2006/0197454 A1 * | 9/2006 | Mizukawa et al. | 315/46 |

FOREIGN PATENT DOCUMENTS

| | | | |
|---|---|---|---|
| EP | 0 475 508 | A2 | 3/1992 |
| EP | 0 562 871 | A1 | 9/1993 |
| EP | 1 699 071 | A1 | 9/2006 |
| FR | 1.282.233 | A | 1/1962 |
| GB | 2 127 618 | A | 4/1984 |
| JP | 4-329253 | A | 11/1992 |
| JP | 7-37833 | A | 2/1995 |
| JP | 7-16353 | A | 3/1995 |
| WO | 00/49641 | A2 | 8/2000 |

* cited by examiner

FILAMENT LAMP AND LIGHT-IRRADIATION-TYPE HEAT TREATMENT DEVICE

BACKGROUND OF THE INVENTION

1. Field of the Invention

This invention relates to a filament lamp and light-irradiation-type heat treatment device, and particularly, to a filament lamp used for heat treatment of an article and a light-irradiation-type heat treatment device equipped with such a filament lamp.

2. Description of Related Art

Heat treatment is used in a variety of processes in the manufacture of semiconductors, including film growth, oxidation, implantation of impurities, nitriding, film stabilization, silicidation, crystallization, and ion injection activation. In particular, rapid thermal processing (hereafter RTP) of a semiconductor wafer or other article to be treated by quickly raising and lowering its temperature enables improved throughput and quality, and so its use is desirable.

Light-irradiation-type heat treatment devices that can heat the article to be treated without contacting it, by means of light irradiation from a light source, such as an incandescent lamp with filaments arranged inside a light emitting bulb made of a material that is transparent to light, is widely used as heat treatment device used for RTP (see, JP-A-H7-37833 and JP-A-2002-203804 corresponding to U.S. Pat. No. 6,876, 816).

By means of a light-irradiation-type heat treatment device of this type, it is possible to heat the article to be treated to a temperature of 1000° C. or higher in a period of from several seconds to several tens of seconds, and to cool the article quickly by stopping the light irradiation.

When using a light-irradiation-type heat treatment device of this type to perform RTP of semiconductor wafers, for example, unevenness of the temperature distribution of a semiconductor wafer when it is heated to a temperature of 1050° C. or higher is liable to cause a phenomenon called "slip" in the semiconductor wafer, in which crystal transition defects arise and quality declines, and so it becomes necessary to heat the semiconductor wafer, hold it at a high temperature, and then cool it so that the temperature distribution will be even across the entire surface.

Even in the event that the light irradiation is performed so that the degree of irradiation is even for semiconductor wafers that have the same treatment characteristics across the entire irradiated surface, at the edges of the semiconductor wafer, heat will be radiated by the side surfaces of the semiconductor wafer, and so the temperature at the edges of the semiconductor wafer will be reduced and there will be unevenness in the temperature distribution of the semiconductor wafer.

To resolve problems of this sort, there have been attempts to make up for the temperature drop due to heat radiation from the sides of the semiconductor wafer, and thus, even out the temperature distribution in the semiconductor wafer by means of light irradiation of the surface at the edges of the semiconductor wafer to a greater degree than the surface at the center of the semiconductor wafer.

However, there may be small, special regions in the article to be treated that are very small relative to the length of the emitted light of the incandescent lamp, and when light irradiation is performed at a light intensity appropriate to the characteristics of these special regions, the regions other than the special regions are irradiated under the same conditions, and so it has not been possible with earlier heat treatment device to adjust temperatures to provide suitable temperature conditions for both the special regions and the other regions, or in other words, to control only the degree of irradiation of the small, special regions so that the temperature status of the article to be treated will be even.

For example, it is common to form a film of metallic oxide or other material on the surface of a semiconductor wafer by the sputtering method and then dope it with impurities by means of ion implantation; the film thickness of such a metallic oxide and the density of the impurity ions will have a localized distribution on the surface of the semiconductor wafer. This localized distribution will not necessarily have central symmetry with respect to the center of the semiconductor wafer; sometimes, with regard to the density of the impurity ions, for example, the density of the impurity ions varies in small, special regions that do not have central symmetry with respect to the center of the semiconductor wafer.

Even in the event that light irradiation is performed so that there is the same degree of irradiation of such special regions and the other regions, there will be differences between them in the speed of temperature rise and the temperature in the special regions will not necessarily be the same as the temperature in other regions, and there may be the problem that the unwanted temperature distribution in the treatment temperature of the article being treated results in difficulty in giving the desired physical properties to the article being treated.

In view of that situation, the present inventors proposed a filament lamp with the following constitution, to be used as the light source of a light-irradiation-type heat treatment device (see the specification of Japanese patent application 2005-191222 and corresponding U.S. Patent Application Publication 2006-197454).

A filament lamp with this constitution has multiple filaments in a light emitting bulb and is constituted to enable individual control of the light emitted by each filament, so that, if it is used as a light source for heating in a light-irradiation-type heat treatment device, it is possible to arrange filaments with high precision with respect to the regions to be irradiated on the article to be treated, by aligning the filaments in parallel rows. Accordingly, by means of such light-irradiation-type heat treatment device, it is possible to supply power individually to the multiple filaments and to individually control the light emitted by each filament, and so it is possible to irradiate with the desired irradiation distribution according to the characteristics of the article to be treated even when the distribution of localized temperature variations on the article to receive heat treatment is non-symmetrical with respect to the article to be treated, with the result that the article to be treated can be heated evenly and an even temperature distribution can be achieved across the entire irradiated surface of the article to be treated.

In recent years, there have been demands for further improvement of throughput (improved processing efficiency) and quality in light-irradiation-type heat treatment devices. To meet these demands, it is considered necessary to further speed up the temperature rise characteristics of semiconductor wafers when filament lamps with the constitution described above are used as light sources; for example, it is considered possible to respond by supplying more power per unit length to the filament than in the past.

However, it was judged that, if the power supplied to the filament is simply increased, there is liable to be unwanted discharge between the leads of neighboring filament assemblies. If such unwanted discharge continues over a long period, there will be the defect of the filament or the lead melting through.

Further, as stated above, to make the temperature distribution even on the irradiated surface of the article to be treated, it is desirable that the filament assemblies be arranged so that the filaments are close to each other (with a small space between filaments), but the problem described above becomes marked with such a constitution.

SUMMARY OF THE INVENTION

This invention is directed to solving of the above-indicated problems. In particular, it is a primary object of the present invention to provide a filament lamp that reliably enables the desired irradiation distribution and also reliably prevents unwanted discharge between filaments or leads of neighboring filament assemblies, thus reliably preventing damage to filaments and leads even when large amounts of power are supplied to the filaments.

Further, another object of this invention is to provide a light-irradiation-type heat treatment apparatus that has such a filament lamp and that is able to evenly heat the article to be treated.

These objects are achieved by a filament lamp in accordance with the invention that has multiple filament assemblies, each comprising a coiled filament and connected leads to supply power to that filament, within a straight-line light emitting bulb with a sealed portion at at least one end, the filament assemblies being orderly arranged in the axial direction of the light emitting bulb axis so that each filament extends in the direction of the bulb axis, the leads of each filament assembly being electrically connected to respective multiple conductive parts set in the sealed portions, and having a power supply mechanism that supplies power to each filament independently, in which the power supply mechanism is an alternating current power supply that is connected to the conductive parts and supplies in-phase current.

The adjacent terminals of neighboring filament assemblies will preferably have the same electrical potential. Further, the power supply mechanism in the filament lamp of this invention can be one that supplies three-phase alternating current power to each filament assembly.

Further, the filament lamp of this invention can also be one that has multiple filament assemblies, each comprising a coiled filament and connected leads to supply power to that filament, within a straight-line light emitting bulb with a sealed portion at at least one end, the filament assemblies being orderly arranged in the axial direction of the light emitting bulb axis so that each filament extends in the direction of the bulb axis, the leads of each filament assembly being electrically connected to the respective multiple conductive parts set in the sealed portions, and having a power supply mechanism that supplies power to each filament independently, in which the power supply mechanism is a direct current power supply that is connected to the conductive parts so that the adjacent terminals of neighboring filament assemblies will have the same polarity.

A constitution in which a discharge suppressing gas is sealed within the light emitting bulb is desirable in the filament lamp of this invention.

Further, the filament lamp of each filament assembly can have a hook-shaped part the tip of which has a radial-direction part that is sandwiched within the coil pitch of the filament and that extends outward in the radial direction of the filament coil. Each of the leads connected to the adjacent ends of neighboring filaments is supported by common support pieces formed of positioning mechanisms with which the hook-shaped parts are engaged, by which means the position of the filament in the light emitting bulb is fixed. Furthermore, globular parts are formed on the hook-shaped part tips that sandwich the support pieces and extend toward each other.

The light-irradiation-type heat treatment device of this invention has a lamp unit with the multiple filament lamps as described above arranged in parallel, in which the article to be treated is heated by irradiating the article to be treated with light emitted by the light unit.

By means of the filament lamp of the invention, it is basically possible to control the light emission of each filament independently, and so it is possible to reliably obtain the desired distribution of irradiation intensity and also to supply alternating current power of the same phase to the adjacent ends of neighboring filament assemblies, thus reducing or eliminating the difference of electric potential between them, and thereby making it possible to reliably prevent the melt-through of filaments or leads caused by the occurrence of unwanted discharge between neighboring filaments or between neighboring leads.

Accordingly, it is possible to supply high power, e.g., 200 W/cm or more, to the filaments and thereby bring about rapid temperature rise characteristics in semiconductor wafers.

According to a second feature of the invention, the power supply mechanism used is one that supplies three-phase alternating current power to the filament assembly so that dispersed connection of a number of filaments that are electrically connected in each phase is possible. The current value flowing in each phase will be smaller than in the case of a single phase and the current value required of the power supply device will be relatively small, so that a reduction of power supply costs is possible.

According to another aspect of the invention, the filament lamp has multiple filament assemblies, each comprising a coiled filament and connected leads to supply power to that filament, within a straight-line light emitting bulb with a sealed portion at at least one end, the filament assemblies being orderly arranged in the axial direction of the light emitting bulb axis so that each filament extends in the direction of the bulb axis, the leads of each filament assembly being electrically connected to respective multiple conductive parts set in the sealed portions, and having a power supply mechanism that supplies power to each filament independently, in which the power supply mechanism is a direct current power supply that is connected to the conductive parts so that the adjacent terminals of neighboring filament assemblies will be in the same polarity. By this means, it is basically possible to control the light emission of each filament independently, and so it is possible to reliably obtain the desired irradiation distribution, and also to supply direct current power so that the adjacent ends of neighboring filament assemblies have the same polarity, thus reducing or eliminating the difference of electric potential between them, thereby making it possible to reliably prevent the melt-through of filaments or leads caused by the occurrence of unwanted discharge between neighboring filaments or between neighboring leads.

By means of a discharge-suppressing gas being sealed within the light emitting bulb, according to another feature of the invention, even if a difference of electrical potential between the leads of neighboring filament assemblies occurs when the temperature in small regions of the article to be treated is adjusted by supplying current of differing magnitudes to individual filaments, the occurrence of unwanted discharge will be even more reliably prevented because of the high dielectric break-down voltage of the discharge-suppressing gas.

According to another aspect of the invention, a globular part is formed on the tip of the hook-shaped portion of the lead so that discharge is concentrated at the end of the lead, and so it is possible to reliably prevent the occurrence of unwanted discharge between neighboring leads.

Further, the hook-shaped portion of the lead is engaged with and supported by a support piece so that displacement with respect to the radial direction of the filament and displacement in the peripheral direction of the filament are regulated and the globular part is checked by the support piece so that movement in the axial direction of the filament assembly is controlled. Therefore, the filament position can be determined even more reliably, each filament can be precisely and easily positioned in its desired position in the light emitting bulb, and changes in the position of the filament assembly over time can be prevented so that it is possible to reliably maintain the initial performance over a long period.

By means of the light-irradiation-type heat treatment device of this invention, having a lamp unit comprising multiple filament lamps makes it possible to set the illumination distribution on the article to be treated precisely and as desired when separated from the lamp unit at a given distance. Therefore, even when the distribution of localized temperature variations on the article to be treated is non-symmetrical with respect to the shape of the article to be treated, it is possible to set the illumination distribution on the article to be treated in response to that, and heat the article to be treated evenly.

Moreover, because the filaments are constituted to enable investment of a large amount of power in the filaments, it is possible to further improve throughput and quality.

DETAILED DESCRIPTION OF THE INVENTION

Figure 1:
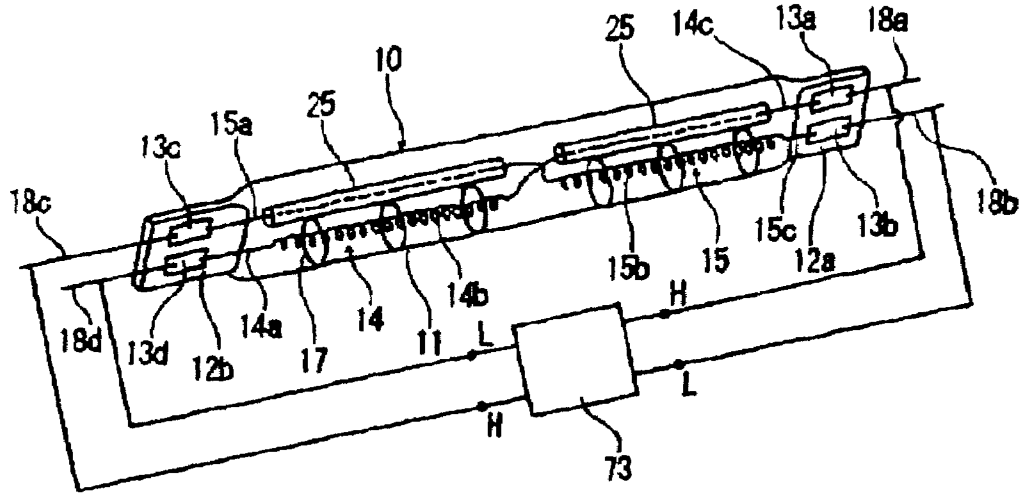
FIG. 1 is an oblique explanatory view showing the basic constitution of one example of a filament lamp in accordance with invention.

FIG. 1 is an oblique explanatory view showing an outline of the constitution of one example of the filament lamp of this invention.

With reference to FIG. 1, the filament lamp has a straight-line light emitting bulb 11 sealed at both ends, and within the light emitting bulb 11 are multiple (two are shown in FIG. 1) filament assemblies 14, 15, comprising filament coils and leads that supply electricity to the filament coils, that are orderly arranged so that the filament coils 14*b*, 15*b* extend in the axial direction of the light emitting bulb 11.

In the first filament assembly 14, a lead 14*c* is connected to one end of the filament coil 14*b* and is electrically connected to an external lead 18*a* that projects through a sealed portion 12*a* of the light emitting bulb 11, by way of a metal foil 13*a* sealed within the sealed portion 12*a*, and another lead 14*a* is connected to the other end of the filament coil 14*b* and is electrically connected to an external lead 18*d* that projects through the other sealed portion 12*b* of the light emitting bulb 11, by way of a metal foil 13*d* sealed within the sealed portion 12*b*. There is an insulating tube 25 on the portion of the lead 14*c* that is opposite the filament coil 15*b* of the second filament assembly 15.

Further, in the second filament assembly 15, a lead 15*c* is connected to one end of the filament coil 15*b* and is electrically connected to an external lead 18*b* by way of a metal foil 13*b* sealed within the sealed portion 12*a*, and another lead 15*a* is connected to the other end of the filament coil 15*b* and is electrically connected to an external lead 18*c* by way of a metal foil 13*c* sealed within the sealed portion 12*b*. There is an insulating tube 25 on the portion of the lead 15*a* that is opposite the filament coil 14*b* of the one filament assembly 14.

The filament assemblies 14, 15 are connected by way of their respective external leads to separate power supply equipment, by which power can be supplied individually to the filaments 14*b*, 15*b* of the filament assemblies 14, 15.

Further, a circular anchor 17 is set along the axial direction of the light emitting bulb 11 in a position between the inner wall of the light emitting bulb 11 and the insulating tube 25. Each filament 14*b*, 15*b* is supported by, for example, three anchors 17 so that it does not contact the light emitting bulb 11.

The filament lamp 10 has a straight-line light emitting bulb 11 made of a light-transparent material, such as quartz glass, and is formed with both ends fused into sealed parts 12*a*, 12*b*. Within this light emitting bulb 11, multiple -for example, two- filament assemblies 14, 15 are arranged sequentially in the axial direction of the light emitting bulb 11; a halogen gas and a specified discharge-suppressing gas described below are sealed within bulb 11.

Figure 2:
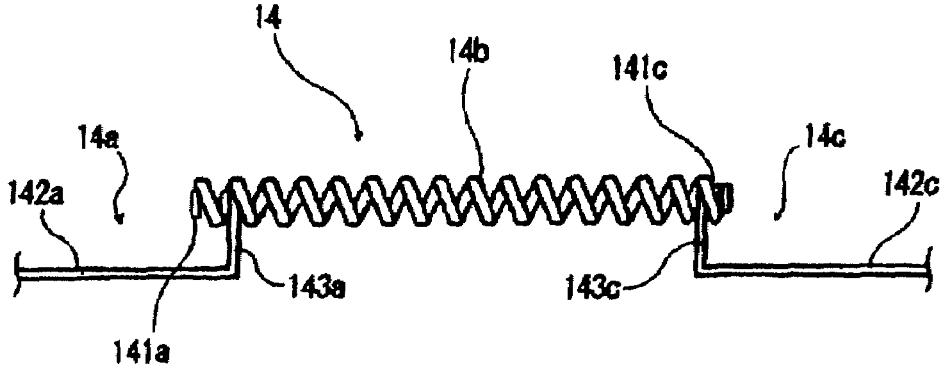
FIG. 2 is an elevational side view of the constitution of a filament assembly in accordance with the invention.

As shown in FIG. 2, the first filament assembly 14 comprises a filament coil 14*b*, a power supply lead 14*a* connected to the other end of the filament coil 14*b*, and a lead 14*c* connected to one end of the filament coil 14*b*.

The lead 14*a* of the first filament assembly 14 is formed of a single strand of wire and comprises a coiled filament connector 141*a* that extends parallel to the coil axis of filament 14*b* with which it connects a radial direction part 143*a* that is continuous with the filament connector 141*a* and extends in the radial direction from the filament connector 141*a*, and a straight lead body 142*a* that is continuous with the radial direction part 143*a* and extends in the axial direction of the coil of the filament connector 141*a*.

The filament connector part 141*a* has an outside diameter matching the inside coil diameter of the filament coil 14*b*.

Further, the lead 14*c* of the first filament assembly 14 has the same constitution as the lead 14*a*, with the symbols labeling each part changed for convenience to a "c" from the "a" of the constituent parts of the lead 14*a*.

Figure 3:
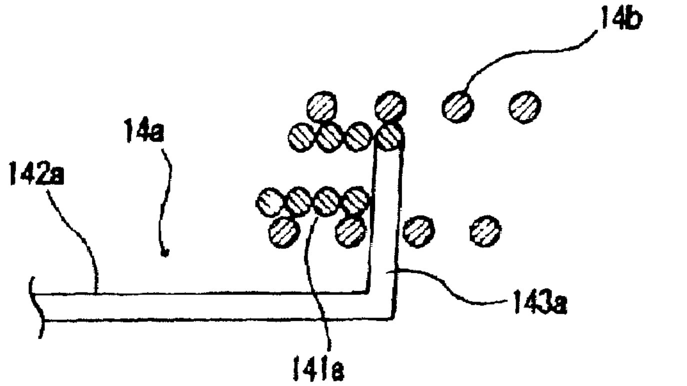
FIG. 3 is an enlarged view showing the connection of the lead and filament of the filament assembly.

In the first filament assembly 14, as shown in FIG. 3, the radial direction part 143*a* of the lead 14*a* is screwed into the other end of the filament coil 14*b*, so that the filament connector 141*a* is inserted into the inside space of the other end of the filament coil 14*b* and is positioned with its outer surface in contact with the inner surface of the filament coil 14*b*. The radial direction part 143*a* is sandwiched within the coil pitch of the filament coil 14*b* so that it projects outward in the radial direction of the filament coil 14*b*, by which a connection between the lead 14*a* and the filament coil 14*b* is achieved.

Similar to the lead 14*c* at one end, the filament connector 141*c* is positioned in contact with the inner surface of the filament coil 14*b*, and the radial direction part 143*c* is sandwiched within the coil pitch of the filament coil 14*b* so that it projects outward in the radial direction of the filament coil 14*b*, by which a connection between the lead 14*c* and the filament coil 14*b* is achieved.

Further, the second filament assembly 15 has the same constitution as the first filament assembly 14, and comprises a filament coil 15*b*, a power supply lead 15*a* connected to the other end of the filament coil 15*b*, and a lead 15*c* connected to one end of the filament coil 15*b*.

The lead 14*a* at the other end of the first filament 14 is electrically connected to an external lead 18*d* by way of a metal foil 13*d* that is sealed within the sealed part 12*b* at the other end of the light emitting bulb 11. Further, the lead 14*c* at one end extends along the bulb axis of the light emitting bulb 11 so that it does not contact the second filament assembly 15, and is electrically connected to the external lead 18*a* by way of a metal foil 13*a* that is sealed within the sealed part 12*a* at one end of the light emitting bulb 11.

The lead 15*a* at the other end of the second filament 15 extends along the bulb axis of the light emitting bulb 11 so that it does not contact the first filament assembly 14, and is electrically connected to the external lead 18*c* by way of a metal foil 13*c* that is sealed within the sealed part 12*b* at one end of the light emitting bulb 11. Further, the lead 15*c* is electrically connected at one end to the external lead 18*b* by way of a metal foil 13*b* that is sealed within the sealed part 12*a* at one end of the light emitting bulb 11.

In this filament lamp 10, there are insulating tubes made of an insulating material, such as quartz, in places where the lead of a filament assembly is opposite the filament or lead of the other filament assembly. By using these insulating tubes, it is possible to reliably prevent electrical short circuits caused by contact between a lead and the anchor 17, described below, attached to a filament.

Specifically, an insulating tube 25 is placed on lead 14*c* at one end of the first filament assembly 14 where it is opposite the filament coil 15*b* of the second filament assembly 15, and an insulating tube 25 is placed on lead 15*a* at the other end of the second filament assembly 15 where it is opposite the filament coil 14*b* of the second filament assembly 14.

In the filament lamp 10, multiple circular anchors 17 are placed along the direction of the bulb axis of the light emitting bulb 11 in positions between the inner wall of the light emitting bulb 11 and the insulating tubes 25; each of the filament coils 14, 15 are supported by, for example, three anchors so that they do not contact the light-emission bulb 11.

The anchors 17 are flexible to the extent that multiple filament assemblies can be easily inserted and positioned in the light emitting bulb 11 during the manufacture of the filament lamp 10.

In a filament lamp 10 with the constitution described above, each of the external leads of the filament assemblies 14, 15 is electrically connected by power supply wiring to power supply device 73 that supplies, for example, single-phase alternating current power so that there will be the same phase at the adjacent ends of the first filament assembly 14 and the second filament assembly 15.

Figure 4:
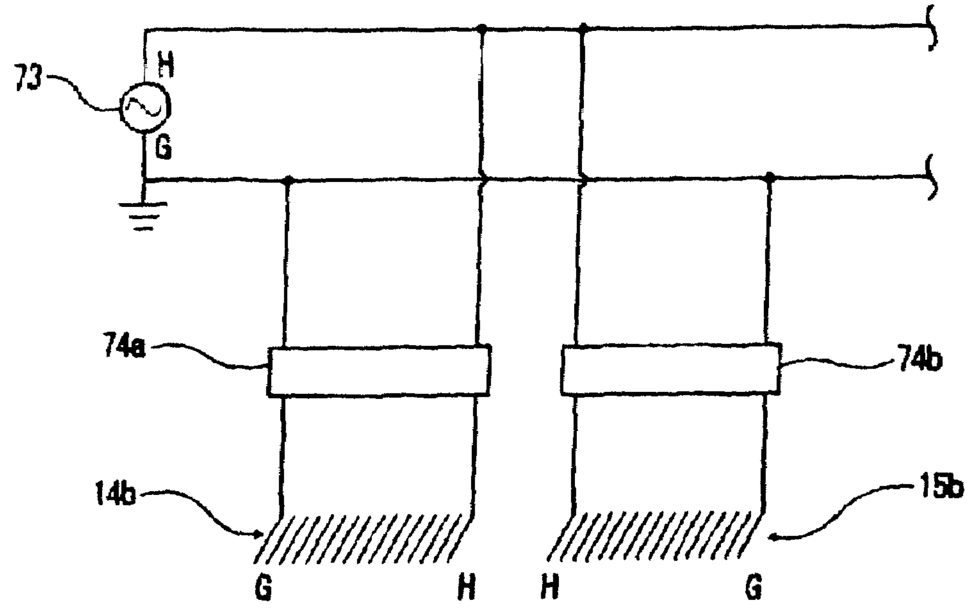
FIG. 4 is a schematic representation of an example of the wiring connection between each filament and the power supply device.

As a concrete explanation of the state of the connection between the filament assemblies 14, 15 and the power supply device 73, as shown in FIG. 4, one end of the filament coil 14*b* of the first filament assembly 14 is electrically connected by way of a power control means 74*a* to the high-voltage side (H) of the power supply device 73, and the other end is electrically connected by way of the power control means 74*a* to the ground (G), which is the low-voltage side (L) of the power supply device 73. Further, the other end of filament coil 15*b* of second filament assembly 15 which is adjacent to one end of the first filament coil 14*b* is electrically connected, by way of the power control means 74*b*, to the high-voltage side H of the power supply device 73, and the lead 15*c* at one end is electrically connected, by way of the power control means 74*b*, to the ground side G. Consequently, the filament coils 14*b*, 15*b* are individually supplied power by way of the power control means 74*a*, 74*b*, and so the light emission of the filament coils 14*b*, 15*b* can be controlled individually.

Thyristors SCR, for example, can be used as the power control means 74*a*, 74*b* in this filament lamp 10, and it is possible to adjust the amount of current fed to the filament assemblies 14, 15 in a range from 0 to 100% of the maximum rated current value of the filament coils 14*b*, 15*b*.

It is also possible to use a constitution in which one end of the filament coil 14*b* of the first filament assembly 14 is electrically connected to the ground side G of the power supply device 73 and the other end is electrically connected to the high-voltage side H of the power supply device 73, while the other end of the filament coil 15*b* of the second filament assembly 15, which is adjacent to on end of the first filament coil 14*b*, is electrically connected to the ground side G of the power supply device 73 and the one end is electrically connected to the high-voltage side H of the power supply device 73.

As stated above, a discharge-suppressing gas with a high dielectric break-down voltage value, to which is added a halogen gas to use the halogen cycle, is sealed within the light emitting bulb 11 in the filament lamp 10 described above. By this means, it is possible to reliably prevent the occurrence of unwanted discharge, even in the event that there is a difference of electrical potential between the adjacent ends of the first filament assembly 14 and the second filament assembly 15.

As the discharge-suppressing gas it is possible to use, for example, nitrogen gas, a rare gas such as argon or krypton, or a mixture of nitrogen and a rare gas; of these, nitrogen gas is particularly preferable because it has a higher dielectric break-down voltage value than the other gases.

The amount of rare gas sealed in is preferably in the range of about $0.8\times10^5$ to $1\times10^6$ Pa at normal temperature.

In the filament lamp described above, when power controlled at an appropriate level by the power control means 74*a*, 74*b* is fed to the filament assemblies 14, 15, a difference of electrical potential is generated between the ends of each of the filament coils 14*b*, 15*b*, so a current flows through filament coils 14*b*, 15*b* and a state of light emission begins. In this state, the difference of electrical potential between one end of the filament coil 14*b* of the first filament assembly 14 and the other end of the filament coil 15*b* of the second filament assembly 15 is slight or non-existent. For example, in the event that a current equivalent to the maximum rated current value is supplied to the filament coils 14*b*, 15, the one end of filament coil 14*b* of the first filament assembly 14 and the other end of the filament coil 15*b* of the second filament assembly 15 will have the same electrical potential.

Moreover, by means of a filament lamp 10 with the constitution described above, it is possible to independently control the state of light emission of the filaments 14*b*, 15*b*, and so it is possible to reliably obtain the desired distribution of luminance. Moreover, because alternating current power can be supplied so that the adjacent ends of the first filament assembly 14 and the second filament assembly 15 are in the same phase, the difference of electrical potential between them will be slight or zero, and so it is possible to reliably prevent the occurrence of unwanted discharge between the filaments 14*b*, 15*b* or between the neighboring leads 14*c*, 15*a*. As a result, it is possible to reliably prevent occurrence of the defect of melt-through of a filament coil or lead.

Further, the filament connectors 141*a*, 141*c* of leads 14*a*, 14*c* are positioned in a state of contact by insertion into the internal space of the filament coil 14*b* and the filament coil 14*b* and the leads 14*a*, 14*c* are connected with the radial direction parts 143*a*, 143*c* sandwiched in the coil pitch. Displacement in the axial direction of the filament coil 14*b* and displacement in the radial direction are controlled by this means, and so even in the event of connection between leads 14*a*, 14*c* and a filament coil 14*b* that has a large wire diameter and a large coil diameter, the two can be reliable connected without enlarging the wire diameter of the leads 14*a*, 14*c* to match the inside diameter of the filament coil 14*b*. For example, even it the filament coil has a wire diameter of 0.5 mm and a coil winding diameter of 4.3 mm and the lead has a wire diameter of 0.8 mm, the two can be reliably connected. Further, the same applies to the second filament assembly 15.

Accordingly, it is possible to supply a high power level of, for example, 200 W/cm or more in the filament coils 14*b*, 15*b* and to reliably prevent the occurrence of short circuits between adjacent filaments while still having a constitution that enables a rapid rise to the desired state of light emission in the filament coils 14*b*, 15*b*.

Further, even in the event that a difference of electrical potential arises because currents of different size are supplied to the filament coils 14*b*, 15*b*, because of a constitution in which a specified discharge-suppressing gas having a high dielectric break-down is sealed within the light emitting bulb 11, it is possible to prevent, even more reliably, the occurrence of unwanted discharge caused by that difference of electrical potential. Accordingly, it is possible to reliably obtain the desired distribution of irradiation.

Figure 5:
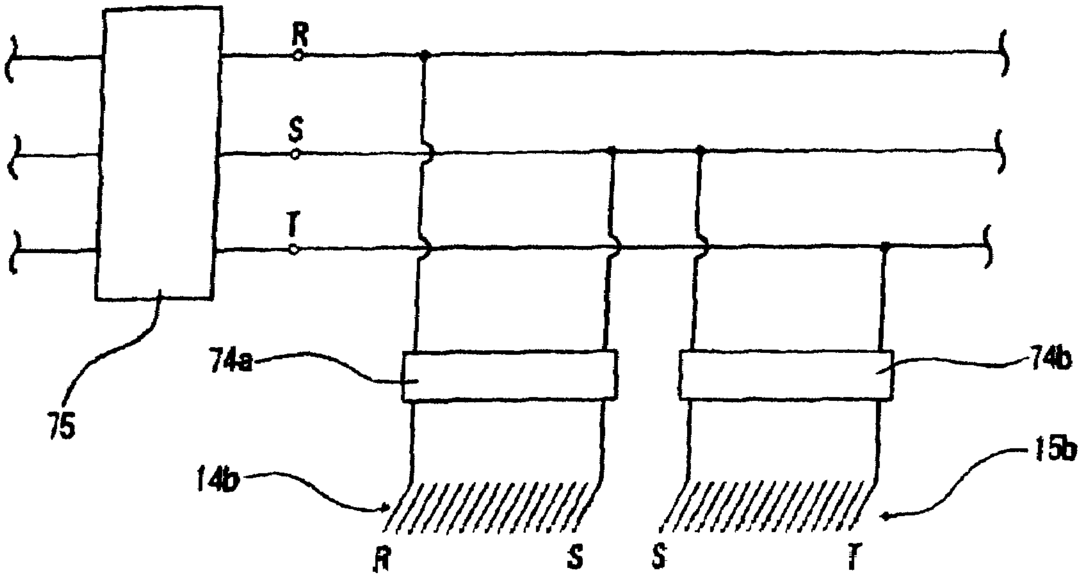
FIG. 5 is a schematic representation of an example of the wiring connection between each filament and the power supply device that supplies three-phase alternating current power to each of multiple filaments.

As shown in FIG. 5, in the filament lamp 10, it is possible to use a power supply device 75 that supplies three-phase alternating current power. The power supply device 75 has three terminals R, S, and T with mutually differing electrical potential, and each of the filaments 14*b*, 15*b* is electrically connected to two of these terminals in such a way that the adjacent ends of the first filament assembly 14 and the second filament assembly 15 are in the same phase.

To explain concretely the state of the connections between the filament assemblies 14, 15 and the power supply device 75 in this embodiment, one end of the filament coil 14*b* of the first filament assembly 14 is electrically connected, by way of the power control means 74*a*, to the S terminal of the power supply device 75, and the other end is electrically connected, by way of the power control means 74*a*, to the R terminal of the power supply device 75. Further, the other end of the filament coil 15*b* of the second filament assembly 15 that is adjacent to the one end of the first filament coil 14*b* is electrically connected, by way of the power control means 74*b*, to the S terminal of the power supply device 75, and the one end is electrically connected, by way of the power control means 74*b*, to the T terminal of the power supply device 75. In other words, the filament coil 14*b* of the first filament assembly 14 is connected to the R-S phase and the filament coil 15*b* of the second filament assembly 15 is connected to the S-T phase, by which means power is supplied individually to the filament coils 14*b*, 15*b*, by way of the power control means 74*a*, 74*b*, making it possible to individually control the state of light emission of the filament coils 14*b*, 15*b*.

By means of a filament lamp with this sort of constitution, it is possible to obtain the same results as described above, and by using power supply device 75 that supplies three-phase alternating current power, it is possible to make a dispersed connection of a number of filaments electrically connected to each phase. And so, the current flowing in one phase can be less than that in the case of a single phase and the current required of the power supply device can be relatively low, so that the cost of supplying power can be reduced.

Figure 6:
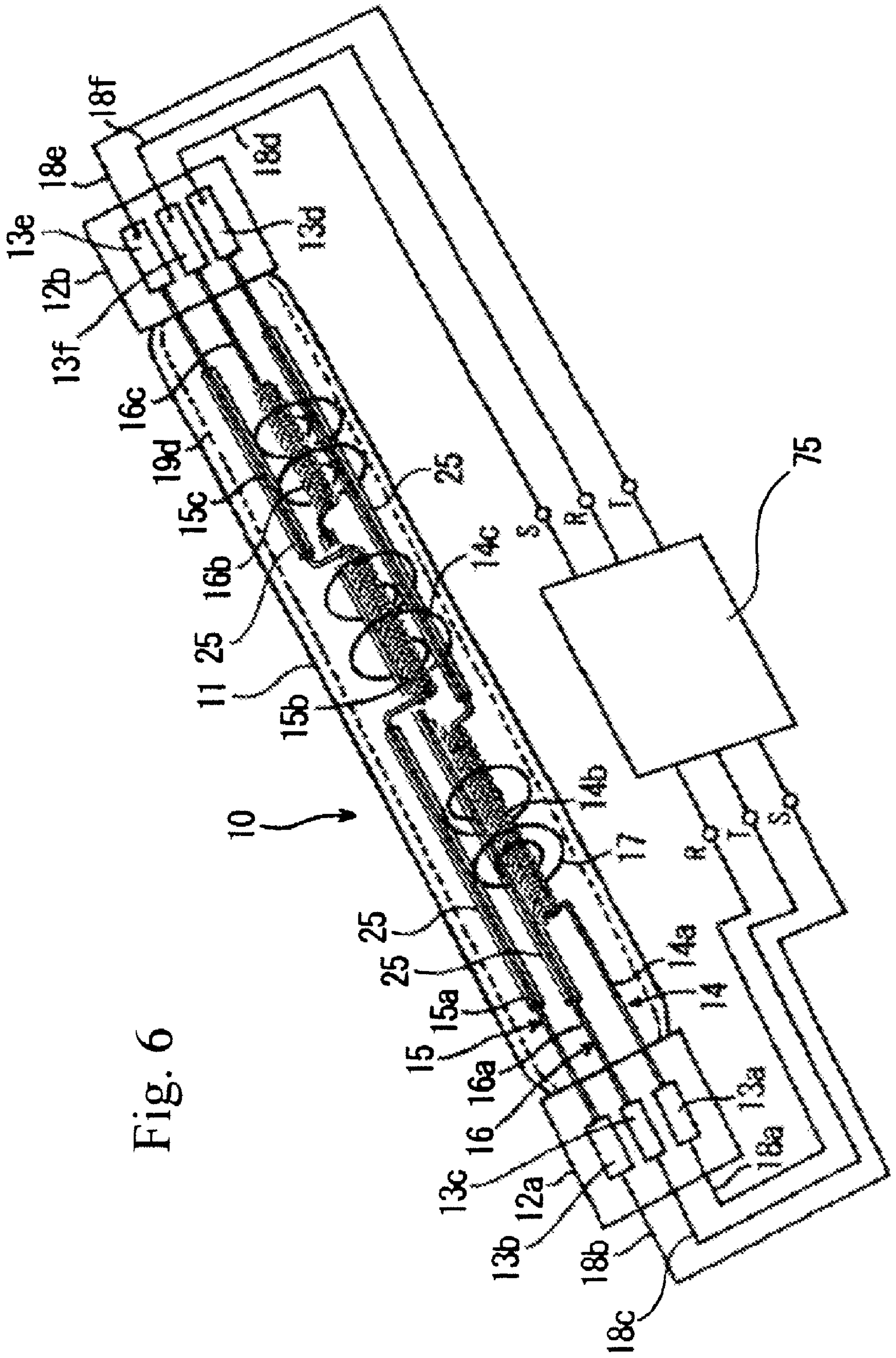
FIG. 6 is an oblique explanatory view showing the basic constitution of another example of a filament lamp of the invention.

Further, in the filament lamp of this invention, the number of filaments can be changed appropriately in accordance with the purpose; as shown in FIG. 6, for example, it is possible to have a constitution with an arrangement of three filament assemblies 14, 15, 16.

This filament lamp 10 has a straight-line light emitting bulb 11 made of a light-transparent material such as quartz glass and formed with both ends fused into sealed parts 12*a*, 12*b*. Within this light emitting bulb 11 there are three filament assemblies 14, 15, 16, having the same constitution as that shown in FIG. 2, with their filament coils sequentially arranged in the axial direction of the light emitting bulb 11.

The leads 14*c*, 15*c*, 16*c* at one end of the first filament assembly 14, the second filament assembly 15, and the filament assembly 16 are electrically connected, by way of the metal foils 13*d*, 13*e*, 13*f* which are sealed within the sealed portions at one end, to external leads 18*d*, 18*e*, 18*f*, and the leads 14*a*, 15*a*, 16*a* at the other end are electrically connected, by way of the metal foils 13*a*, 13*b*, 13*c* which are sealed within the sealed portions at the other end, to external leads 18*a*, 18*b*, 18*c*.

In this filament lamp 10, the external leads of the filament assemblies 14, 15, 16 are electrically connected by power supply wiring to the power supply device 75 so that the adjacent ends of the first filament assembly 14 and the second filament assembly 15 are in the same phase and the adjacent ends of the second filament assembly 15 and the third filament assembly 16 are in the same phase.

Figure 7:
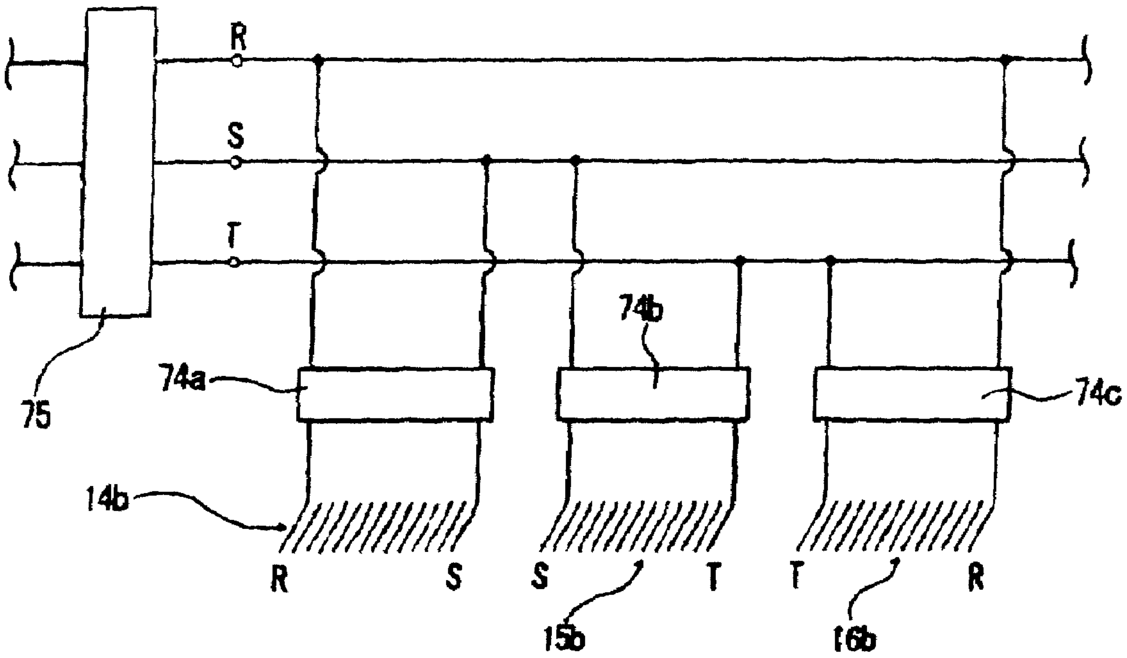
FIG. 7 is a schematic representation of an example of the wiring connection between each filament and the power supply device of the filament lamp shown in FIG. 6.

To concretely explain the state of the connections between the filament assemblies 14, 15, 16 and the power supply device 75, as shown in FIG. 7, one end of the filament coil 14*b* of the first filament assembly 14 is electrically connected, by way of the power control means 74*a*, to the S terminal of the power supply device 75, and the other end is electrically connected, by way of the power control means 74*a*, to the R terminal of the power supply device 75. Further, one end of the filament coil 15*b* of the second filament assembly 15 is electrically connected, by way of the power control means 74*b*, to the S terminal of the power supply device 75, and the one end is electrically connected, by way of the power control means 74*b*, to the T terminal of the power supply device 75. Moreover, one end of the filament coil 16*b* of the third filament assembly 16 is electrically connected, by way of the power control means 74*c*, to the R terminal of the power supply device 75, and the other end is electrically connected, by way of the power control means 74*b*, to the T terminal of the power supply device 75. In other words, the filament coil 14*b* of the first filament assembly 14 is connected to the R-S phase, the filament coil 15*b* of the second filament assembly 15 is connected to the S-T phase, and the filament coil 16*b* of the third filament assembly 16 is connected to the T-R phase, by which means power is supplied individually to the filament coils 14*b*, 15*b*, 16*b*, by way of the power control means 74*a*, 74*b*, 74*c*, making it possible to individually control the state of light emission of the filament coils 14*b*, 15*b*, 16*b*.

In this filament lamp 10, also, it is preferable that a discharge-suppressing gas with a high dielectric break-down voltage value, to which is added a halogen gas to use the halogen cycle, be sealed within the light emitting bulb 11. By this means, it is possible to reliably prevent the occurrence of unwanted discharge even in the event that there is a difference of electrical potential between the adjacent ends of neighboring filament assemblies. The same gases used in the embodiment described above can be used as the discharge-suppressing gas.

In the filament lamp described above, when power controlled at an appropriate level by the power control means 74*a*, 74*b*, 74*c* is fed to the filament assemblies 14, 15, 16, a difference of electrical potential is generated between one end and the other end of each of the filament coils 14*b*, 15*b*, 16*b*, so a current flows through filament coils 14*b*, 15*b*, 16*b* and a state of light emission begins. In this state, the difference of electrical potential between one end of the filament coil 14*b* or lead of the first filament assembly 14 and the other end of the filament coil 15*b* or lead of the second filament assembly 15 is slight or non-existent, and the difference of electrical potential between one end of the filament coil 15*b* or lead of the second filament assembly 15 and the other end of the filament coil 16*b* or lead of the third filament assembly 16 is slight or non-existent.

Moreover, by means of a filament lamp 10 with the constitution described above, it is possible to control independently the state of light emission of the filaments 14*b*, 15*b*, 16*b*, and so it is possible to reliably obtain the desired distribution of luminance. Moreover, because three-phase alternating current power can be supplied so that the adjacent ends of the filament assemblies are in the same phase, the difference of electrical potential between them will be slight or zero, and so it is possible to reliably prevent the occurrence of unwanted discharge between the neighboring filaments or between the neighboring leads. As a result, it is possible to reliably prevent occurrence of the defect of melt-through of a filament coil or lead.

Further, even in the event that a difference of electrical potential between the adjacent ends of the filament coils 14*b*, 15*b*, 16*b* arises because currents of different size are supplied to the filament coils 14*b*, 15*b*, 16*b*, because of a constitution in which a specified discharge-suppressing gas is sealed within the light emitting bulb 11, the discharge-suppressing gas will have a high dielectric break-down and it is possible to prevent, even more reliably, the occurrence of unwanted discharge caused by that difference of electrical potential. Accordingly, it is possible to reliably obtain the desired distribution of irradiation.

Figure 8:
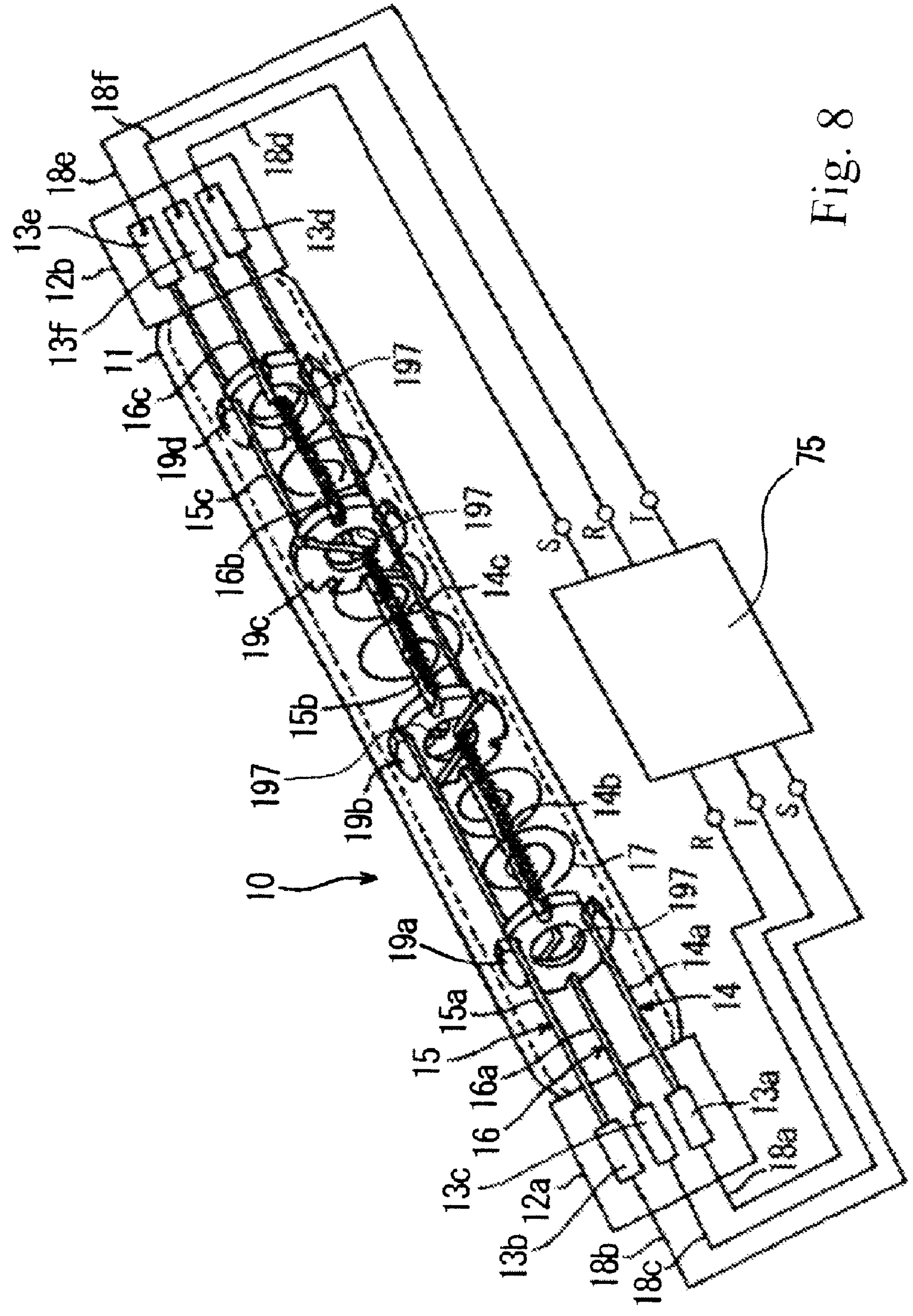
FIG. 8 is an oblique explanatory view showing an outline of the constitution of yet another filament lamp in accordance with the invention.

Moreover, it is possible to give the filament lamp of this invention the constitution shown in FIG. 8 in which the filament lamp 10 has the same constitution as the filament lamp shown in FIG. 6, except that the constitution of the filament assemblies is different from the filament lamp constitution shown in FIG. 6, and multiple flat support pieces 19*a*, 19*b*, 19*c*, 19*d* made of an insulating material, such as quartz glass, are located within the light emitting bulb 11 in positions between the adjacent filaments and perpendicular to the bulb axis.

Figure 9:
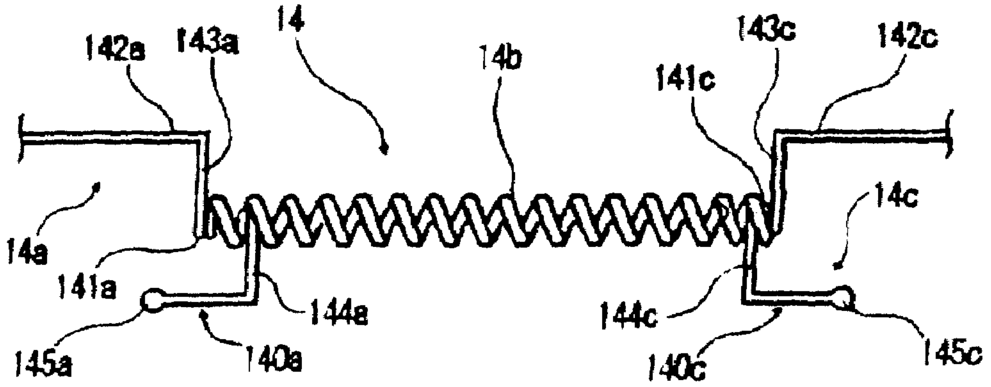
FIG. 9 is a side elevational view of the filament assembly of the filament lamp shown in FIG. 8.

As shown in FIG. 9, the first filament assembly 14 comprises the filament coil 14*b*, a power supply lead 14*a* connected to the other end of this filament coil 14*b*, and a lead 14*c* connected to the one end of the filament coil 14*b*. The lead 14*a* at the other end of the filament coil 14*b* is formed of a single strand of wire and has a wire lead body 142*a* and a hook-shaped portion 140*a* with a radial direction part that extends in a direction perpendicular to the lead body 142 (the radial direction of the connected filament coil).

The hook-shaped portion 140*a* comprises a radial direction part 143*a* that is continuous with the lead body 142*a* and is bent to extend in a direction perpendicular to the lead body 142*a*, a coiled filament connector 141*a* that is continuous with the radial direction part 143*a* and that extends with its coil axis parallel to the lead body 142*a*, and an L-shaped part 144*a* that is continuous with the filament connector 141*a*, extends in a direction perpendicular to the direction of the coil axis, and is bent so the tip extends in the direction of the coil axis.

The filament connector 141*a* has an outside diameter that matches the inside coil diameter of the filament coil 14*b*.

The tip of the L-shaped part 144*a* of the lead 14*a* has an edgeless globular part 145*a* formed by melting with, for example, a laser.

The lead 14*c* at the one end of the first filament assembly 14 has the same constitution as the lead 14*a*, with the symbols labeling each part changed for convenience to a "c" from the "a" of the constituent parts of the lead 14*a*.

In first filament assembly 14, by twisting the other end of the filament coil 14*b* onto the L-shaped 144*a* of the lead 14*a*, the filament connector 141*a* can be inserted in the internal space in the other end of the filament coil 14*b* and positioned with its outer surface in contact with the inner surface of the filament coil 14*b*; the L-shaped part 144*a* will be sandwiched within the coil pitch of the filament coil 14*b* and will project outward in the radial direction of the filament coil 14*b*, by which means the connection of the lead 14*a* and the filament coil 14*b* is achieved.

Similar to the lead 14*c*, the filament connector 141*c* is positioned with its outer surface in contact with the inner surface of the filament coil 14*b*; the L-shaped part 144*c* is sandwiched within the coil pitch of the filament coil 14*b* and projects outward in the radial direction of the filament coil 14*b*, by which means the connection of the lead 14*c* and the filament coil 14*b* is achieved.

The second filament assembly 15 and the third filament assembly 16 have the same constitution as the first filament assembly 14, with the power supply lead 15*a* (16*a*) connected to the other end of the filament coil 15*b* (16*b*) and the lead 15*c* (16*c*) connected to the one end of the filament coil 15*b* (16*b*).

Figure 10:
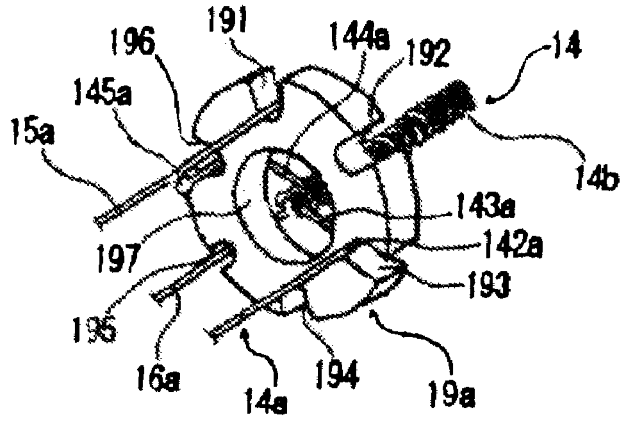
FIG. 10 is a perspective view of the connection between the filament assembly and a support part.

As shown in FIG. 10, an opening 197 is formed roughly in the center of the support piece 19*a*, and multiple, perhaps six, cut-outs 191, 192, 193, 194, 195, 196, that constitute a positioning mechanism to determine the position of the filaments are formed at equidistant positions on the periphery.

Forming the opening 197 is not essential, but making the opening 197 in the support piece enables enlargement of the gap between the support piece and the filament coil and makes it possible to reduce the thermal load on the support piece.

Further, the other support pieces 19_b_, 19_c_, 19_d_ are constituted in the same way as the support piece 19_a_.

The first filament assembly 14 is attached to the support piece 19_a_ by engaging the L-shaped part 144_a_ of the lead 14_a_ on the other end in the cut-out 196 of the support piece 19_a_ and inserting the lead body 142_a_ into the opposite cut-out 193, with the filament coil 14_b_ extending from the support piece 19_a_ in a direction perpendicular to one face of the support piece 19_a_. The lead 14_c_ at the one end is similarly attached to the support piece 19_b_ by engaging the L-shaped part 144_c_ of the lead 14_c_ on the one end in a cut-out of the support piece 19_b_ and inserting the lead body 142_c_ into the opposite cut-out, with the filament coil 14_b_ extending from the support piece 19_b_ in a direction perpendicular to the other face of the support piece 19_b_.

The lead 14_a_ at the other end of the first filament assembly 14 is electrically connected, by way of the metal foil 13_a_ sealed within the sealed portion 12_a_ at the other end of the light emitting bulb 11, to the external lead 18_a_.

Further, the lead 14_c_ at one end is inserted into cut-outs in support pieces 19_c_, 19_d_ not used for determining the positions of the hook-shaped parts of the leads of the second filament assembly 15 and the third filament assembly 16, and extends along the bulb axis of the light emitting bulb 11; it is electrically connected, by way of the metal foil 13_d_ sealed within the sealed portion 12_b_ at the one end of the light emitting bulb 11, to the external lead 18_d_.

The second filament assembly 15 is attached to the support piece 19_b_ by engaging the hook-shaped part of the lead 15_a_ on the other end in a cut-out of the support piece 19_b_ not used for determining the position of the lead 14_c_ of the first filament assembly 14 and inserting the lead body 152_a_ into the opposite cut-out, with the filament coil 15_b_ extending from the support piece 19_b_ in a direction perpendicular to one face of the support piece 19_b_. The hook-shaped part of the lead 15_c_ at one end is attached to the support piece 19_c_ in the same way, by which means the second filament assembly 15 is positioned and supported in the light emitting bulb 11.

The lead 15_a_ at other end of the second filament assembly 15 is inserted into the cut-out 191 in support piece 19_a_, which is not used for determining the positions of the lead 14_a_ of the first filament assembly 14 (see FIG. 10), and extends along the bulb axis of the light emitting bulb 11. The lead 15_a_ is electrically connected, by way of the metal foil 13_b_ sealed within the sealed portion 12_a_ at the other end of the light emitting bulb 11, to the external lead 18_b_.

Further, the lead 15_c_ at one end is inserted into a cut-out in the support piece 19_d_ that is not used for determining the positions of the lead 16_c_ of the third filament assembly 16, and extends along the bulb axis of the light emitting bulb 11. The lead 15_c_ is electrically connected, by way of the metal foil 13_e_ sealed within the sealed portion 12_b_ at the one end of the light emitting bulb 11, to the external lead 18_e_.

The third filament assembly 16 is attached to the support piece 19_c_ by engaging the hook-shaped part of the lead 16_a_ on the other end in a remaining cut-out of the support piece 19_b_ that supports the second filament assembly 15 and inserting the lead body into the opposite cut-out, with the filament coil 16_b_ extending from the support piece 19_c_ in a direction perpendicular to one face of the support piece 19_c_. The hook-shaped part of the lead 16_c_ at one end is attached to the support piece 19_d_ in the same way, by which means the third filament assembly 16 is positioned and supported in the light emitting bulb 11.

The lead 16_a_ at the other end of the third filament assembly 16 is inserted into cut-outs in support pieces 19_b_, 19_a_ that are not used for determining the positions of the leads 14_a_, 14_c_, 15_a_ of the other filament assemblies 14, 15 (for example, cut-out 195 in support piece 19_a_; see FIG. 10), and extends along the bulb axis of the light emitting bulb 11. The lead 16_a_ is electrically connected, by way of the metal foil 13_c_ sealed within the sealed portion 12_a_ at the other end of the light emitting bulb 11, to the external lead 18_c_.

The lead 16_c_ at one end of the filament assembly 16 is electrically connected, by way of the metal foil 13_f_ sealed within the sealed portion 12_b_ at the one end of the light emitting bulb 11, to the external lead 18_f_.

Figure 11:
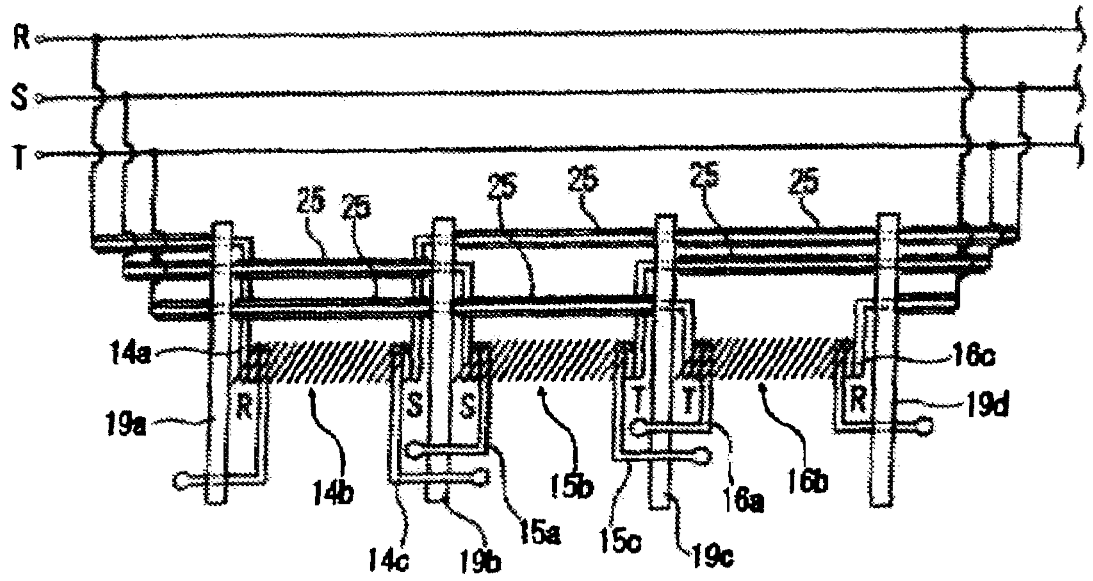
FIG. 11 is an explanatory view showing an example of the wiring connection between each filament and the power supply device of the filament lamp shown in FIG. 8.

In this filament lamp 10, the external leads of the filament assemblies 14, 15, 16 are electrically connected by power supply wiring to the power supply device 75, which supplies three-phase alternating current power, in such a way that the adjacent ends of the first filament assembly 14 and the second filament assembly 15 are in the same phase and the adjacent ends of the second filament assembly 15 and the third filament assembly 16 are in the same phase. Specifically, as shown in FIG. 11, the filament coil 14_b_ of the first filament assembly 14 is connected in the R-S phase, the filament coil 15_b_ of the second filament assembly 15 is connected in the S-T phase, and the filament coil 16_b_ of the third filament assembly 16 is connected in the T-R phase, by which means the filament coils 14_b_, 15_b_, 16_b_ are individually supplied power by way of a power control means (not illustrated), making it possible to individually control the state of light emission of the filament coils 14_b_, 15_b_, 16_b_.

Moreover, by means of a filament lamp 10 with the constitution described above, it is possible to obtain the same results as with the filament lamp 10 described above. That is, it is possible to control independently the state of light emission of the filaments 14_b_, 15_b_, 16_b_, and so it is possible to reliably obtain the desired distribution of luminance. Moreover, because three-phase alternating current power can be supplied so that the adjacent ends of the filament assemblies are in the same phase, the difference of electrical potential between them will be slight or zero, and so it is possible to reliably prevent the occurrence of unwanted discharge between the neighboring filaments or between the neighboring leads. As a result, it is possible to reliably prevent occurrence of the defect of melt-through of a filament coil or lead.

Further, even in the event that a difference of electrical potential between the adjacent ends of the filament coils 14_b_, 15_b_, 16_b_ arises because currents of different size are supplied to the filament coils 14_b_, 15_b_, 16_b_, because of a constitution in which a specified discharge-suppressing gas is sealed within the light emitting bulb 11, the discharge-suppressing gas will have a high dielectric break-down and it is possible to prevent, even more reliably, the occurrence of unwanted discharge caused by that difference of electrical potential. Accordingly, it is possible to reliably obtain the desired distribution of irradiation.

Also, the leads of the filament assemblies are supported by support pieces that form a positioning mechanism by engaging the hook-shaped portions in the cut-outs, by which means displacement (movement) of the filament coil in the peripheral direction is controlled and so position determining of the filament assemblies can be made even more reliable.

Accordingly, the filament coils 14_b_, 15_b_, 16_b_ can be precisely and easily positioned in its desired position in the light emitting bulb 11, and changes in the position of the filament assembly over time can be prevented so that it is possible to reliably maintain the initial performance over a long period.

Further, in the event that it is necessary to replace a constituent part of a filament lamp because of an unexpected incident, such as a broken wire in the filament coil 14*b*, 15*b*, 16*b*, because the filament coils 14*b*, 15*b*, 16*b* are positioned in the light emitting bulb 11 with high reproducibility and high precision, it is possible to assure the reproducibility of the luminance distribution before and after replacement of a filament assembly.

In this way, given a constitution in which two neighboring filament assemblies are supported by a common support piece, the hook-shaped parts of leads that are engaged in the same support piece are each close to the other filament assembly, but because a globular part is formed on the tip of the hoop-shaped part of each lead, it is difficult for discharge to concentrate at the end of the lead, and so it is possible to reliably prevent the occurrence of unwanted discharge between neighboring leads.

The explanation above has been of constitutions that supply alternating current power to each of multiple filament assemblies, but it is possible in the filament lamp of this invention to have a constitution in which direct current power is supplied to the filament assemblies. The following explanation gives an example of a filament lamp with the constitution shown in FIG. 1 (in which the number of filament assemblies is two), in which direct current power is supplied to the filament assemblies.

Figure 12:
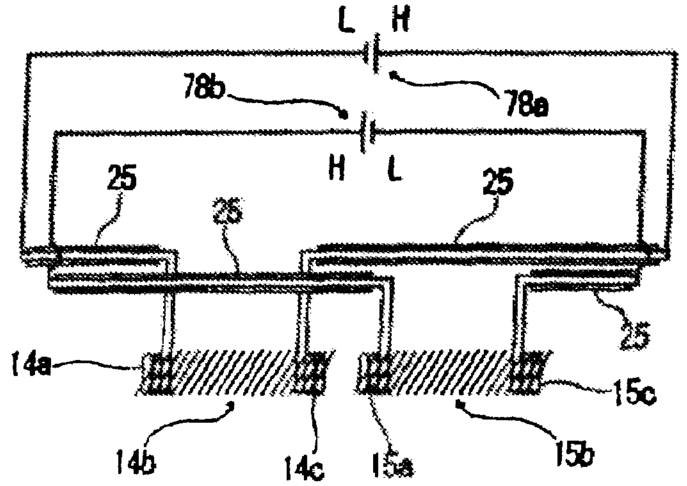
FIG. 12 is an explanatory view showing an example of the wiring connection between each filament and the power supply device of the filament lamp when the power supply used supplies direct current power to each of multiple filament assemblies.

FIG. 12 is an explanatory view showing one example of the wiring connection between each filament and the power supply device in another embodiment of the filament lamp of this invention. In this filament lamp, the lead 14*c* at one end of the first filament assembly 14 is connected to the high-voltage side (positive electrode side) of the first direct current power supply 78*a*, and the lead 14*a* at the other end of the first filament assembly 14 is connected to the low-voltage side (negative electrode side) of the first direct current power supply 78*a*.

Further, the lead 15*c* at one end of the second filament assembly 15 is connected to the high-voltage side (positive electrode side) of the second direct current power supply 78*b*, and the lead 15*a* at the other end of the second filament assembly 15 is connected to the low-voltage side (negative electrode side) of the second direct current power supply 78*b*.

Accordingly, the adjacent ends of the first filament assembly 14 and the second filament assembly 15 have the same polarity, and the direct current power supply devices 78*a*, 78*b* invests direct current power separately in the filament coils 14*b*, 15*b*.

A filament lamp constituted as described above provides the same results as a constitution in which alternating current power is supplied to the filament assemblies. That is, because direct current power is supplied so that the adjacent ends of the first filament assembly 14 and the second filament assembly 15 have the same polarity, even in the event that a large amount of power is supplied to the filaments, the difference in electrical potential between them will be slight or zero, and so it is possible to reliably prevent the occurrence of unwanted discharge between the filament coils 14*b*, 15*b* or between the leads 14*c*, 15*c*. As a result it is possible to reliably prevent the occurrence of the defect of filament or lead melt-through.

Further, even in the event that a difference of electrical potential arises because currents of different size are supplied to the filament coils, a discharge-suppressing gas is sealed within the light emitting bulb, and since the discharge-suppressing gas has a high dielectric break-down, it is possible to prevent, even more reliably, the occurrence of unwanted discharge.

Embodiments of the filament lamp of this invention have been explained above, but the invention is not limited to these embodiments; various changes can be made.

For example, the number of filament assemblies is not limited, and can be changed as is appropriate to the purpose. If there is a large number of filament assemblies, it is possible to control the distribution of luminance relative to the article to be treated even more precisely. For a diffusion process that requires highly precise temperature control, for example, five or more are preferable, and in the event of treatment of large semiconductor wafers of a diameter of 300 mm or more, seven to nine are preferable.

Also, the conductive material fused into the sealed portions is not limited to metal foil; a plate-shaped piece can be used.

As stated above, the filament lamp of this invention is constituted to enable independent control of the state of light emission of multiple filaments arranged within the light emitting bulb, and it is constituted to enable investment of large amounts of power into the filament assemblies without causing unwanted discharge between the filament assemblies. It is, therefore, very useful as a heating light source for light-irradiation-type heat treatment. The light-irradiation-type heat treatment device of this invention is explained below.

Light-Irradiation-Type Heat Treatment Device

Figure 13:
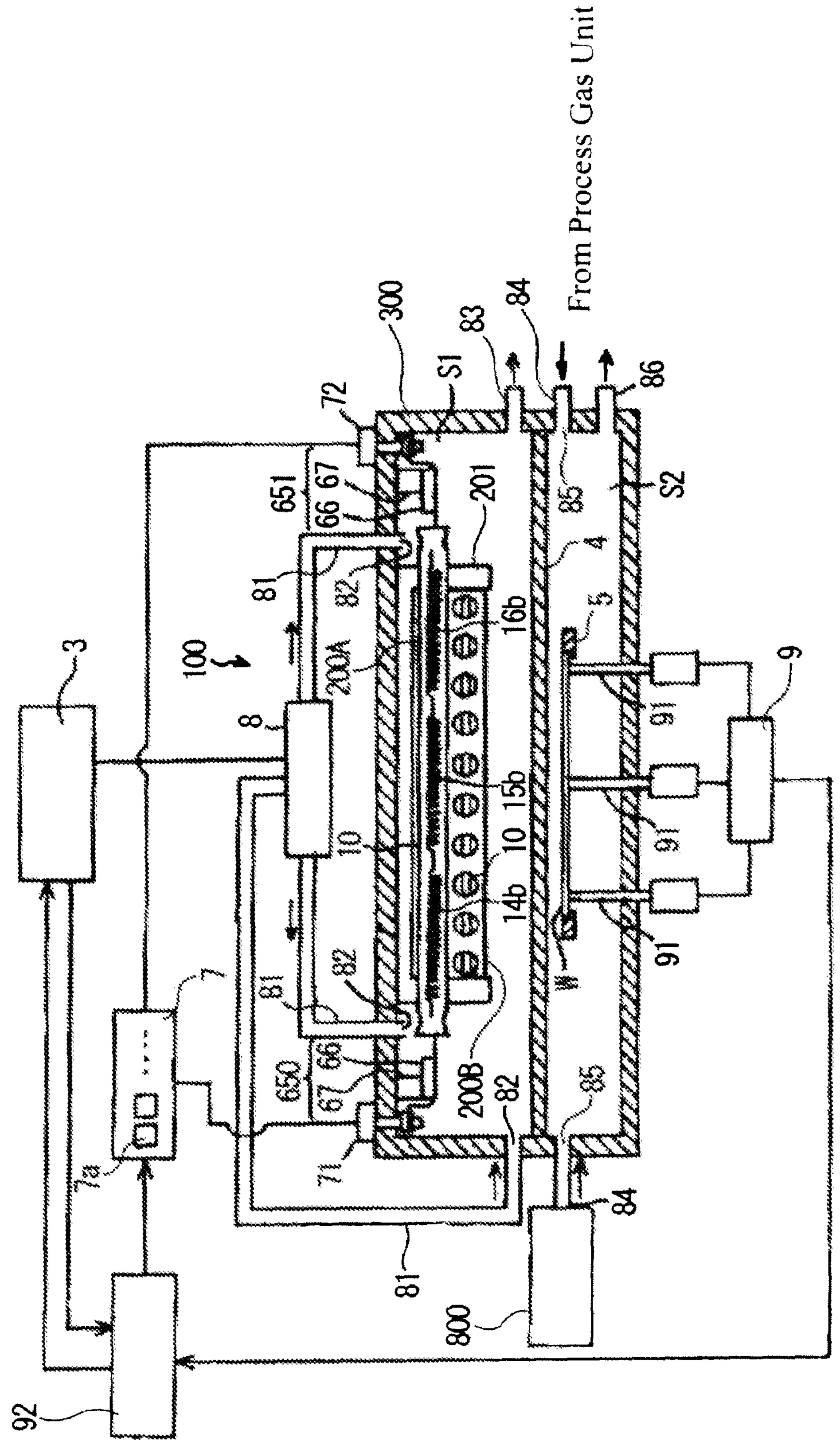
FIG. 13 is a cross-sectional view showing the configuration of one example of the light-irradiation-type heat treatment device of this invention.
Figure 14:
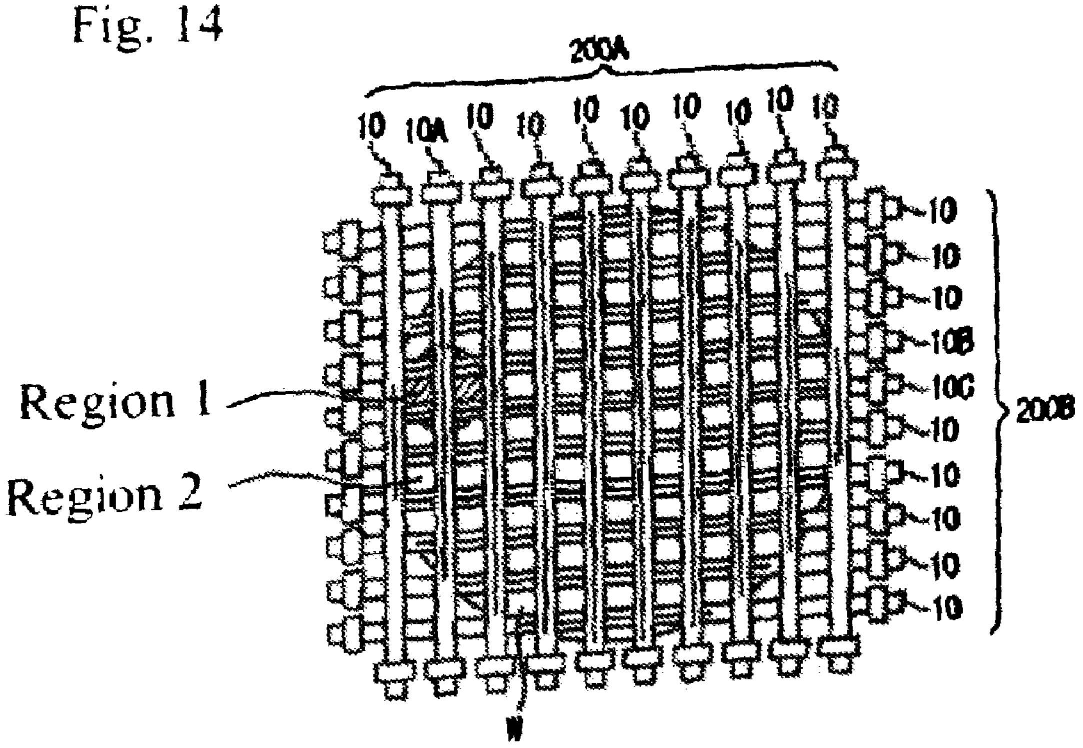
FIG. 14 is a plan view showing the array of filaments in a first lamp unit and a second lamp unit that make up the light source of the light-irradiation-type heat treatment device shown in FIG. 13.

FIG. 13 is a front cross-sectional view showing an outline of the constitution of one example of the light-irradiation-type heat treatment device of this invention. FIG. 14 is a plane view showing the array of filaments in the first lamp unit and the second lamp unit that make up the light source of the light-irradiation-type heat treatment device shown in FIG. 13.

This light-irradiation-type heat treatment device 100 has a chamber 300 of which the interior space is divided vertically by an aperture plate 4 made of quartz, for example, forming a lamp unit accommodation space S1 and a heat treatment space S2.

In the lamp unit accommodation space S1, a first lamp unit 200A having perhaps ten of the filament lamps 10 described above positioned with their central lamp axes in one plane and parallel at a specified distance and a second lamp unit 200B having perhaps ten of the filament lamps 10 described above positioned with their central lamp axes in one plane and parallel at a specified distance are arranged opposite each other, one above and one below.

The filament lamps 10 of the first lamp unit 200A and the filament lamps 10 of the second lamp unit 200B have their central lamp axial directions crossing each other.

A reflecting mirror 201 that reflects the light beams irradiated upward from the first lamp unit 200A and the second lamp unit 200B onto the article to be treated W is located above the first lamp unit 200A.

The reflecting mirror 201 is, for example, gold coated onto a base of oxygen-free copper, and the reflecting cross section has a shape selected from, for example, part of a circle part of an ellipse, part of a parabola, or flat.

The filament lamps 10 of the first lamp unit 200A are supported by a pair of first fixed beds 650, 651. The first fixed beds 650, 651 comprise conductive beds 66 made of a conductive material and support beds 67 made of a ceramic or other insulating material. The support beds 67 are mounted on the wall of the chamber 300 and support the conductive beds 66.

Taking the number of filament lamps 10 making up the first lamp unit 200A as n1 and the number of filament assemblies in a filament lamp 10 as m1, n1×m1 sets of paired first fixed beds 650, 651 will be required for a constitution that supplies power independently to all the filament assemblies.

The filament lamps 10 of the second lamp unit 200B are supported by second fixed beds (not shown); the second fixed beds, like the first fixed beds, comprise conductive bed and support beds.

Taking the number of filament lamps 10 making up the second lamp unit 200B as n2 and the number of filament assemblies in a filament lamp 10 as m2, n2×m2 sets of paired second fixed beds will be required for a constitution that supplies power independently to all the filament assemblies.

Paired power source supply ports 71, 72 that are connected to the power supply wiring from the multiple power supply devices that make up a power source 7 are located in the chamber 300; the number of sets of paired power source supply ports 71, 72 is set in accordance with the number of filament lamps 10 and the number of filament assemblies in each filament lamp 10.

In this embodiment, the power source supply ports 71 are electrically connected to the conductive beds 66 of the first lamp fixed beds 650 and the conductive beds 66 of the first lamp fixed beds 650 are electrically connected to, for example, the external leads that are connected to the leads 14*a* connected to the other ends of the filament coils 14*b*.

Further, the power source supply ports 72 are electrically connected to the conductive beds 66 of the first lamp fixed beds 651 and the conductive beds 66 of the first lamp fixed beds 651 are electrically connected to, for example, the external leads that are connected to the leads 14*c* connected to the one ends of the filament coils 14*b*. By this means, the filament coils 14*b* of one filament lamp in the first lamp unit 200A are electrically connected to the power supply device 7*a* of the power source 7.

Further, the other filament coils 15*b*, 16*b* in this filament lamp 10 are electrically connected in the same way to power supply devices by other paired power source supply ports 71, 72. Then, the same electrical connections to power supply devices are made for the filament coils of other filament lamps 10 making up the first lamp unit 200A and the filament coils of the filament lamps 10 making up the second lamp unit 200B.

By means of this type of arrangement, the distribution of luminance on the article to be treated W can be set at will and with high precision by selectively lighting the filament coils or by individually regulating the amount of power supplied to each filament coil.

A cooling mechanism to cool the filament lamps during heat treatment of the article to be treated W is installed in this light-irradiation-type heat treatment device.

Concretely, cooling air from a cooling air unit 8 mounted outside the chamber 300 is introduced into the lamp unit accommodation space S1 by way of the jet 82 of a cooling air supply nozzle 81, and by blowing this cooling air onto the filament lamps in the first lamp unit 200A and the second lamp unit 200B, the light emitting bulbs 11 that make up each filament lamp 10 are cooled, after which cooling air that has attained a high temperature through heat exchange is exhausted to the outside through a cooling air exhaust port 83 formed in the chamber 300.

Because the sealed parts 12*a*, 12*b* of the filament lamps 10 have lower temperature resistance than other parts, it is desirable that the jets 82 of the cooling air supply nozzles 81 of this cooling mechanism be formed pointing at the sealed parts 12*a*, 12*b* of the filament lamps so as to preferentially cool the sealed parts 12*a*, 12*b* of the filament lamps.

Now, the flow of the cooling air introduced into the lamp unit accommodation space S1 is set so that cooling air that has attained a high temperature through heat exchange does not heat the filament lamps instead, and so that the reflecting mirror 201 is cooled simultaneously. Further, it is not necessary to set the flow of cooling air so the reflecting mirror 201 will be cooled simultaneously if the reflecting mirror 201 is constituted with water cooling by means of a water cooling mechanism (not shown).

Further, this light-irradiation-type heat treatment device 100 is constituted with jets 82 of the cooling air supply nozzles 81 positioned near the aperture plate 4 so the aperture plate 4 is cooled by cooling air from the cooling air unit 8. This makes it possible to reliably prevent the occurrence of such defects as temperature control redundancy of the article to be treated W by the action of unwanted heating of the article to be treated W (for example, overshoot when the temperature of the treated material exceeds the set temperature) when there is secondary thermal radiation from the aperture plate 4 of heat radiated from the heated article to be treated W, or reduced temperature uniformity in the article to be treated W caused by scattered temperatures in the aperture plate 4 itself, which has stored heat, or a drop in the rate of temperature drop by the article to be treated W.

In the heat treatment space S2 in the chamber 300, there is a treatment support 5 to which the article to be treated W is fixed.

In the event that the article to be treated W is a semiconductor wafer, the treatment support 5 is a thin, ring-shaped body made of a high melting point metallic material such as molybdenum, tungsten, or tantalum, of a ceramic material, such as silicon carbide (SiC), or of quartz or silicon (Si). The treatment support 5 is preferably constructed with a guard ring structure formed with steps to support the semiconductor wafer within a circular opening.

Because the treatment support 5 itself is raised to a high temperature by the light irradiation, the treatment support 5 provides supplemental thermal radiation to the opposing edge of the semiconductor wafer, and thus compensates for reduced temperatures at the edge of the semiconductor wafer caused by such things as thermal radiation from the edge of the semiconductor wafer.

In order to monitor the temperature distribution of the article to be treated W, multiple temperature gauges, comprising thermocouples or radiation thermometers, are placed behind the article to be treated W that is set on the treatment support 5, in contact with or close to the article to be treated W, and the temperature gauges 91 are connected to a thermometer 9. There are no particular limits on the number or positioning of the temperature gauges 91 which can be placed in consideration of the dimensions of the article to be treated W.

Based on the temperature information monitored by the temperature gauges 91, the thermometer 9 has the functions of calculating the temperatures at the measurement points of the temperature gauges 91, based on the temperature information monitored by the temperature gauges 91, and sending the calculated temperature information to the main controller 3 by way of the temperature controller 92.

The main controller 3 has the function of sending commands to the temperature controller 92, based on the temperature information at the measurement points on the article to be treated W, so that the temperatures on the article to be treated W will be at the specified level and distributed uniformly.

The temperature controller 92 has the function of controlling, on the basis of commands from the main controller 3, the amounts of power supplied to the filament coils of the filament lamps from the power source 7.

In the event that the main controller, receives temperature information from the temperature controller to the effect that the temperature at a measurement point is lower than the designated temperature, it sends a command to the temperature controller 92 to increase the amount of power supplied to the filament coils that provide light-irradiation to the measurement point in question and nearby positions, so that the light radiated from those filament coils will be increased. On the basis of commands sent by the main controller 3, the temperature controller 92 increases the power supplied from the power source 7 to the power source supply ports 71, 72 connected to the filament coils in question.

The main controller 3 also sends commands to the cooling air unit 8 when the filament lamps 10 in the lamp units 200A, 200B are burning, and based on those commands, the cooling air unit 8 provides cooling air so that the light emitting bulbs 11, the reflecting mirror 201, and the aperture plate 4 do not overheat.

A process gas unit, which introduces and exhausts process gases to and from the heat treatment space S2 in accordance with the variety of heat treatment, is connected to this light-irradiation-type heat treatment device.

In the event of a thermal oxidation process, for example, a process gas unit 800 is connected to introduce and exhaust oxygen gas to the heat treatment space S2, and to introduce a purge gas (such as nitrogen gas) to purge the heat treatment space S2 and exhaust it.

The process gas and purge gas from the process gas unit 800 are introduced into the heat treatment space S2 by way of jets 85 of gas supply nozzles 84 installed in the chamber 300, and are exhausted to the outside by way of exhaust ports 86.

In the light-irradiation-type heat treatment device 100 described above, the filament coils of the filament lamps making up the first lamp unit 200A and the second lamp unit 200B are lit by supplying power controlled at the proper level to them from the power source 7; by this means the light radiated by the filament lamps irradiates the article to be treated W mounted in the heat treatment space S2 through the aperture plate 4, either directly or reflected by the reflecting mirror 201, and heat treatment of the article to be treated W is performed.

Also, by means of the light-irradiation-type heat treatment device 100 described above, the filament lamps that make up the first lamp unit 200A and the second lamp unit 200B are constituted to prevent unwanted discharge between the adjacent parts of neighboring filament assemblies, and so in both the first lamp unit 200A and the second lamp unit 200B, filament lamps 10 that have multiple filament assemblies orderly arranged lengthwise in the light emitting bulb, power being supplied to each filament assembly independently, are arranged in rows. By this means, it is possible to adjust the distribution of luminance both along the axial direction of the light emitting bulbs and in the perpendicular direction, and it is therefore possible to set with high precision the distribution of luminance on the surface of the article to be treated W.

It is possible, for example, to define a small, special region with a total length shorter than the light emission length of the filament lamp and to set a luminance level for that special region, and so it is possible to set a luminance distribution that reflects the characteristics of the special region and the other regions. In the event that, on the article to be treated W shown in FIG. 14, for example, the temperature of the region beneath the points where filament lamp 10A crosses filament lamps 10B, 10C (called "region 1") is lower than the temperature of the rest of the article to be treated W (called "region 2"), or if it is decided in advance that the rate of temperature rise in region 1 will be less than the rate of temperature rise in region 2, it is possible to adjust the temperatures of region 1 and region 2 to be uniform by increasing the amount of power fed to those filament coils among the filament coils of the filament lamp 10 that correspond to region 1. Now, the lines drawn within the individual filament lamps in FIG. 14 indicate the positions of filament coils. It is possible, therefore, to perform heat treatment with a temperature distribution that is uniform across the entire article to be treated W. The positions of filament coils in each filament lamp 10 is shown with a single straight line in FIG. 14, but this indicates the total length of multiple, lined-up filament coils; depiction of the multiple filament coils one by one has been omitted.

Further, it is possible to set the distribution of luminance on the article to be treated W, which is separated from the lamp units 200A, 200B by a specified distance, minutely and as desired. As a result, it is possible to set the luminance distribution on the article to be treated W asymmetrically with respect to the shape of the article to be treated W. Accordingly, even in the event that the distribution of localized rates of temperature variation on the article to be treated W is asymmetrical, it is possible to respond to that and set the irradiation distribution on the article to be treated W and to heat the article to be treated W with a uniform temperature distribution.

Also, because the filament lamp 10 is constituted so that undesired discharge between filaments can be reliably prevented and so that the separating distance between the filaments in the light emitting bulb is very small, it is possible to minimize the effect of the non-light-emitting gaps between filaments, and to hold unwanted scattering of the luminance distribution on the article to be treated to very low levels.

What is claimed is:

1. A filament lamp having multiple filament assemblies, each filament assembly comprising a coiled filament and connected leads to supply power to that filament, within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, wherein the power supply mechanism is an alternating current power supply which is connected to the conductive parts and supplies in-phase current.

2. A filament lamp as described in claim 1, wherein the power supply mechanism is adapted to supply power such that adjacent terminals of neighboring filament assemblies have the same electrical potential.

3. A filament lamp as described in claim 1, wherein the power supply mechanism supplies three-phase alternating current power to each filament assembly.

4. A filament lamp as described in claim 1, in which a discharge suppressing gas is sealed within the light emitting bulb.

5. A filament lamp having multiple filament assemblies, each filament assembly comprising a coiled filament and connected leads to supply power to that filament, within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, wherein the power supply mechanism is a direct current power supply that is connected to the conductive parts so that the adjacent terminals of neighboring filament assemblies will have the same polarity.

6. A filament lamp as described in claim 5, in which a discharge suppressing gas is sealed within the light emitting bulb.

7. A filament lamp having multiple filament assemblies, each filament assembly comprising a coiled filament and connected leads to supply power to that filament, within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, wherein the lead of each filament assembly has a hook-shaped part of which a tip has a radially directed part that is engaged by being sandwiched within a coil pitch of the filament and that extends outward in the radial direction of the filament coil, wherein each of the leads connected to adjacent ends of neighboring filaments is supported by a common support piece formed of positioning mechanisms with which the hook-shaped parts are engaged, by which the position of the filaments in the light emitting bulb is fixed, and wherein globular parts are formed on tips of the hook-shaped parts that sandwich the support pieces and extend toward each other.

8. Light-irradiation-type heat treatment device having a lamp unit with multiple filament lamps arranged in parallel, in which an article to be treated is heated by irradiating the article to be treated with light emitted by the light unit, wherein each lamp has multiple filament assemblies, each filament assembly comprising a coiled filament and connected leads to supply power to that filament, within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, and wherein the power supply mechanism is an alternating current power supply that is connected to the conductive parts and supplies in-phase current.

9. Light-irradiation-type heat treatment device having a lamp unit with multiple filament lamps arranged in parallel, in which an article to be treated is heated by irradiating the article to be treated with light emitted by the light unit, wherein each lamp has multiple filament assemblies, each filament assembly comprising a coiled filament and connected leads to supply power to that filament, within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, and wherein the power supply mechanism is a direct current power supply that is connected to the conductive parts so that the adjacent terminals of neighboring filament assemblies will have the same polarity.

10. Light-irradiation-type heat treatment device having a lamp unit with multiple filament lamps arranged in parallel, in which an article to be treated is heated by irradiating the article to be treated with light emitted by the light unit, wherein each lamp has multiple filament assemblies, each filament assembly comprising a coiled filament and connected leads to supply power to that filament within a straight-line light emitting bulb with a sealed portion at at least one end, the filament assemblies being sequentially arranged in the axial direction of the light emitting bulb axis, the leads of each filament assembly being electrically connected to respective multiple conductive parts set in the sealed portions, and having a power supply mechanism that supplies power to each filament independently, wherein the lead of each filament assembly has a hook-shaped part of which a tip has a radially directed part that is engaged by being sandwiched within a coil pitch of the filament and that extends outward in the radial direction of the filament coil, wherein each of the leads connected to adjacent ends of neighboring filaments is supported by a common support piece formed of positioning mechanisms with which the hook-shaped parts are engaged, by which the position of the filaments in the light emitting bulb is determined, and wherein globular parts are formed on tips of the hook-shaped parts that sandwich the support pieces and extend toward each other.

* * * * *